Aug. 19, 1969    L. H. GIRARD ET AL    3,461,513
SEPARABLE FASTENING DEVICE
Filed Feb. 20, 1967
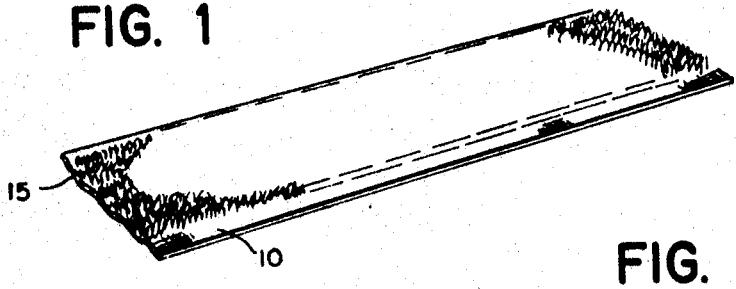
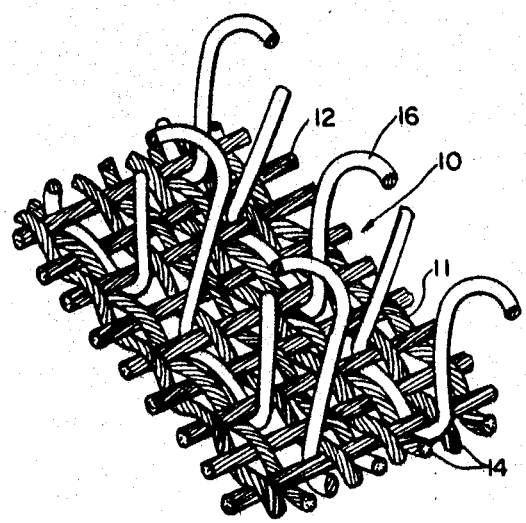
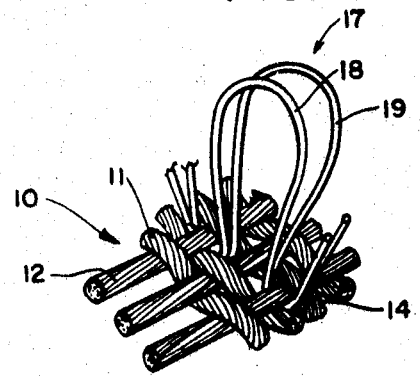
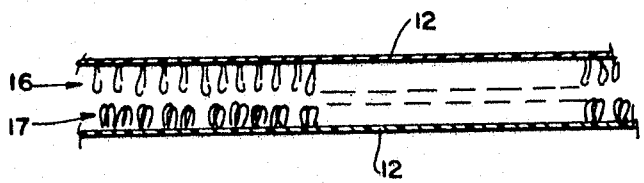
INVENTORS
LAURENT H. GIRARD
CLIVE E. HOCKMEYER
MARCEL C. OUELETTE
ATTORNEYS

United States Patent Office 3,461,513
Patented Aug. 19, 1969

3,461,513
SEPARABLE FASTENING DEVICE
Laurent H. Girard, Bedford, N.H., Clive E. Hockmeyer, Lowell, Mass., and Marcel C. Ouellette, Manchester, N.H., assignors to American Velcro, Inc., a corporation of New Hampshire
Filed Feb. 20, 1967, Ser. No. 617,265
Int. Cl. A44b 17/00
U.S. Cl. 24—204                                    9 Claims

ABSTRACT OF THE DISCLOSURE

A separable fastening device having a very large number of closely spaced hooking elements of the hook and loop type such that pressing opposed surfaces of two fastening members together in face-to-face relation will engage a large number of hooks and loops; the hooking elements are formed of metal and in preferred forms are operable at temperatures from cryogenic temperatures to above 1000° F.

BACKGROUND OF THE INVENTION

Field of the invention

This invention relates to a separable fastening device of the type having two members each provided with a very large number of closely spaced interengageable hooking elements with certain of the hooking elements comprising metal hooks and certain of the hooking elements comprising metal loops. The hooks and loops are characterized by the property that opposed surfaces of two can be pressed together in face-to-face relation so that a large number of hooks will engage a large number of loops for several cycles of repeated engagement and disengagement without permanently deforming the hooks or loops and without substantially crushing the loops. The invention also relates to a method of making these fastening devices.

DESCRIPTION OF THE PRIOR ART

U.S. Patents Nos. 2,717,437 and 3,083,737 and 3,154,837 disclose various forms of separable pile fastening devices, i.e., a fastener comprised of two separate tapes having interengageable piles which contain loop elements and loop engaging hook elements. The fastening devices described in these patents are recited as preferably being constructed from synthetic resin materials such as polyamide like nylon. For some applications these tapes may be fabricated from textile material with an interwoven pile of synthetic material.

Engageable pile fasteners have found a wide variety of uses where ease of opening and closing is desired such as in clothing, footwear, belts, curtains, tapestry, and also for a variety of uses in the manned space program. However, due to the construction of such fasteners and the polymeric materials utilized for the interengageable pile elements, such fasteners are not adapted to applications in which the fastener must withstand shearing or normal stresses at very high temperatures and at cryogenic temperatures or repeated opening and closing cycles at such temperatures. It has generally been found that commercially available fasteners of this type have a practical operating range of from below about —25° F. to about 290° F. It is accordingly the object of this invention to provide a separable fastening device which will function at low and high temperatures not heretofore possible.

SUMMARY OF THE INVENTION

Broadly stated, the invention relates to a separable fastening device of the type characterized in that pressing opposed surfaces of two members together in face-to-face relation a large number of hooks will engage a large number of loops. The device is comprised of two members each provided with a very large number of closely spaced engageable hooking elements, certain of the hooking elements comprising metal hooks and certain of the hooking elements comprising metal loops and each of the members having a base of sheet material with the hooking elements secured thereto in positions extending generally upright from one surface of the base. The hooks are comprised of a hardened metal characterized by resilient spring properties such that pressing of opposed surfaces of the members together in face-to-face relation wherein a large number of hooks engage a large number of loops and upon subsequent separation of the members, the hooks have sufficient spring to return to substantially their original form. The loops are formed of a metal characterized by sufficient tensile strength and spring to resist breaking, permanent deformation and crushing after several cycles of repeated engagement and disengagement.

The fastening device preferably has a woven construction in which the base sheet is comprised of a ground weave of warp and weft yarns and the hooking elements are provided by supplemental yarns. The base sheets can be comprised of a high temperature synthetic strand but it is preferred for the maximum temperature range and life of the device that the base sheet be woven from multi-filament strands of fine diameter metal wire which have high temperature properties complementary to those properties of the hooking elements. The all-metal construction of the fastening devices offer advantages in the heat treatments to which they can be subjected to improve their properties.

The method of making separable fastening members of this type involves forming the hooking elements of metal in a base member preferably by a weaving operation and cutting at least some of the hooking elements to form hooks. With the all-metal fastening devices the multi-filament metal strands are subjected to a special pre-coating operation prior to weaving which is subsequently heated to cause decomposition and vaporization, and at the same time the hooking elements are subjected to a heat treating operation to eliminate the brittleness which is imparted to the hooking elements by working during weaving.

It is also characteristic of the loop elements that they be formed with pairs of loop elements with one element in each pair being a softer metal than the other element so that the combined effect of a large number of these paired elements is to give ease of engagement with hooking elements and resistance to crushing.

BRIEF DESCRIPTION OF THE DRAWING

FIG. 1 is a perspective view of one tape member of the fastening device of the invention showing hooking elements extending from one surface thereof;

FIG. 2 is an enlarged fragmentary perspective of a hook element in a fastening device of the invention;

FIG. 3 is an enlarged fragmentary perspective of paired loop elements in a fastening device of the invention; and FIG. 4 is a side elevation of two tape members forming a fastening device in opposed face-to-face relationship but spaced apart.

DESCRIPTION OF THE PREFERRED EMBODIMENTS

In the two preferred embodiments to be described below, both fastening members comprising a fastening device have visually the same construction as shown in FIGS. 1–4. They are comprised basically of a woven base sheet 10 which has been woven from warp and weft yarns 11 and 12 into a fabric tape construction along with auxiliary or supplemental metal wire 14 which extends upright from the base sheet to form upstanding hooking elements 15 of the hook 16 or loop 17 type. The loop elements are formed of paired wires 18 and 19 of different metal alloys. The underlying distinction between the two embodiments is that the first embodiment has a base sheet which is woven from multi-filament strands of metal wire whereas in the second embodiment, the base sheet is formed of multi-filament strands of a high temperature synthetic filament.

Further distinctions which will be pointed out in more detail below are that the hooking elements in the first embodiment are firmly locked in the base sheet by the condition in which the base sheet is placed by a heating operation whereas the back adhesive coating is required in the second embodiment. Also, being an all-metal construction, the first embodiment is subjected to a heating treatment which so improves the properties of the hooking elements that it is operable for a substantially greater number of times of engagement and disengagement than is the second embodiment. This is not to suggest that the fastening device of the second embodiment is inoperable, but merely that the lifetime of the all-metal construction is increased because it can be subjected to a heat treatment at elevated properties.

FIRST EMBODIMENT

The warp and weft yarns are strands of 90 filaments per strand of the fine diameter (.0005 inch) stainless steel having the following composition in percent by weight:

| | |
|---|---|
| Chromium | 19 |
| Nickel | 10 |
| Carbon, max. | 0.08 |
| Iron | 71 |

In the method of making the members of the fastening device, the fine stranded wires were bound together with a volatile adhesive coating such as an acrylic to provide strength in the strand and prevent breakage of the filaments during weaving. A volatile lubricating coating, such as liquid paraffin, was applied on top of the acrylic coating in order to prevent chafing during weaving and sticking while on the warp spools. These warp and weft yarns were then tightly woven with a supplemental yarn extending upright therebetween in the form of a loop to define the hooking elements in the fastening device with the warp and weft yarns forming a fabric ground weave base sheet tightly woven so as to hold the hooking elements upright and locked into the ground weave.

For the hook element, a cobalt nickel alloy having the following composition in percent by weight was used:

| | |
|---|---|
| Cobalt | 40 |
| Chromium | 20 |
| Nickel | 15 |
| Molybdenum | 7 |
| Manganese | 2 |
| Beryllium | .04 |
| Carbon | .15 |
| Iron | Balance |

The wire was in 47 percent reduced condition prior to weaving. It preferably had a diameter of .004 inch and after being woven into loop form, the member was subjected to a heat treatment at 980° F. for 5 hours. It was brought up to the 980° F. condition over a period of two hours to first decompose and vaporize the coatings contained in the ground wires and after heating for this period of time, which is sufficient time at temperature to age the alloy, the brittleness of the wire resulting from strain hardening of the wire by mechanical working during the weaving operation was relieved and its spring properties improved. Subsequently, the hardened and aged hooking alloy was cut by suitable cutters adjacent their ends to form hook elements.

In forming the loop elements paired wires of two distinct alloy compositions were used as a supplemental yarn. The first wire in the pair, herein called the "spring wire," had the same alloy composition as the wire used for the hook described above except that it was used in the 22 percent reduced condition and thus the final spring qualities were not equal to that of the hook elements. In addition, the diameter of this spring wire was .00225 inch. The second wire of the pair, called the loop wire, had the following metal alloy composition in percent by weight and was used in the 15 percent reduced condition.

| | | |
|---|---|---|
| Nickel [1] | min. percent | 70.0 |
| Chromium | | 14.0–17.0 |
| Iron | | 5.0–9.0 |
| Titanium | | 2.25–2.75 |
| Columbium [2] | | 0.70–1.20 |
| Manganese | max | 1.0 |
| Silicon | max | 0.5 |
| Sulfur | max | 0.01 |
| Copper | max | 0.5 |
| Carbon | max | 0.08 |

[1] Contains small amount of cobalt.
[2] Contains small amount of tantalum.

In weaving with the paired supplemental wire yarns, the paired wires were not twisted together but rather they were laid flat in the weaving machine so that upon forming the loops they are free to separate from each other as shown in FIG. 3. These paired wires were woven with the ground weave to provide a pair of upstanding loops of spring wire and soft wire. This paired wire construction provided the combination of properties essential to continued use of the fastening device. The spring wire has sufficient strength and spring to resist being crushed during handling and repeated use, while the soft wire has sufficient softness so that it will be displaced without springing by a hook wire when the hook wire is pressed into the pile loops during engagement. It was found that a pile composed of all-soft wires will engage hooks well but is too easily crushed for continued use, and the spring wires alone while resisting crushing does not engage the hooks as readily. It has further been found that the loop wires preferably are finer in diameter than the hook wires and there must be many more loops per area than hooks.

The use of the alloy composition selected for the soft wire is particularly applicable in this combination because it is not significantly embrittled by weaving and by using the wire in the initially cold worked condition and further cold working the wire during weaving and following this weaving operation with an aging treatment at elevated temperatures so that substantial spring is imparted to the wire and embrittlement to the extent that it will prevent the hooks from returning to their original shape after repeated opening and closing is removed.

By heating these fastening devices to the proper heat treating temperature for a period of time sufficient to age the alloy and eliminate embrittlement of the hook wire and the spring loop wire, the fastening devices retained about 44 to 66 percent of their initial shear and tension properties after 100 opening and closing cycles and microscopic examination after this test showed only a small amount of breakage and distortion of the hook and loop. Fastening devices not heat treated had substantially poorer properties than those which were heat treated.

It has further been found that this heat treatment causes an interlocking of the roots of the hooking elements to such an extent that with an initially tight ground weave there is no need to apply any adhesive backing to the ground weave to retain the hooking elements in place. It has been found that a tape member having a length of 100 feet which was heat treated to a temperature of 830° F. for 5 hours reduced in length by about 1½ inch and it is theorized that this small but significant shrinkage is the vehicle by which the additional interlocking around the roots of the hooking elements is realized after being heat treated.

These fastening devices were further tested at temperatures up to 1050° F. and they operated at this temperature for an extended period of time and were also tested in a liquid helium bath having a temperature of about —420° F. to determine their cryogenic properties and found the device also functioned satisfactorily.

The weaving operation is performed substantially as described in the prior art patents referred to above. Thus, the members are woven on a modified narrow fabric or broad fabric loom which operates in the same manner as a pile loom for the production of velvet type ribbon or terry cloth, with each of the supplemntal wires or auxiliary warp wires being formed into a loop pile during weaving by being alternately disposed on either side of its respective lancet by means of doupes. Preferably the lancets broaden in cross section toward their ends to tighten the loops into a generally circular configuration. A velvet type pile loom of this type is described in detail in U.S. Patent No. 3,083,727.

SECOND EMBODIMENT

In a second embodiment, the same alloy composition was used for the hook elements and the loop elements. The base sheet was formed of a ground weave of a high temperature resistant nylon filament yarn specifically an aromatic polyamide marketed under the trademark Nomex by E. I. du Pont de Nemours & Co., Wilmington, Del. In this embodiment, fine denier warp yarns e.g., 100 denier, and coarser denier filling yarns e.g., 200 denier, were used to provide the tight weave required to hold the hook and loop in the base sheet. While the hook and loop elements could sustain the elevated temperatures described in the first embodiment, the ground weave was limited by the synthetic material used and had an upper elevated temperature level of about 500° F. In this embodiment, it was found necessary to apply a coating of adhesive to the back of the ground weave and it was found that a polyimide which was capable of sustaining 500° F. temperatures gave good bonding between the hooking elements and the ground weave and had sufficient rigidity to allow cutting and was still flexible enough to permit rolling up as finished tape. This coating also provided a bonding surface for subsequent adherence to substrates.

This second embodiment falls short of the high operating temperatures of the first embodiment but it still is operable at temperatures up to 500° F. and at cryogenic temperatures. Because it was not possible to heat the hooking elements to the heat treating temperature of the hook and spring loop, the second embodiment was not as good a fastening device from a standpoint of extended reuse, but being operable at these middle temperatures between the first embodiment and the presently commercially available fastening devices, it provides a useful but limited life fastening device.

We claim:

1. A separable fastening device of the type having two members each provided with a very large number of closely spaced interengageable hooking elements, certain of said hooking elements comprising metal hooks and certain of said hooking elements comprising metal loops and characterized by the property that pressing opposed surfaces of two members together in face-to-face relation, a large number of hooks will engage a large number of loops, the improvement in combination therewith comprising a base of sheet material with said hooking elements secured thereto in positions extending generally upright from one surface of the base, said hooks comprised of a hardened metal characterized by resilient spring properties such that pressing of opposed surfaces of the members together in face-to-face relation wherein a large number of hooks engage a large number of loops and upon subsequent separation of the members, the hooks having sufficient spring to return to substantially their original form after several cycles of repeated engagement and disengagement and said loops formed of paired wires with the first wire of the pair characterized by a hardened metal having resilient spring properties to resist being crushed during engagement and the second wire of the pair characterized by a metal softer than the first and possessing sufficient softness to be displaced without springing by a hook wire when the hook wire is pressed into the loops during engagement.

2. A separable fastening device according to claim 1 wherein the base fabric of each member is woven, with the hooking elements interlaced within the base and extending from one surface of the base member.

3. A separable fastening device according to claim 1 wherein the base weave is shrunk about the roots of the hooking elements to interlock the hooking elements into the base weave.

4. A separable fastening device according to claim 1 wherein one loop in the pair is formed of a heat hardened spring cobalt nickel alloy wire and the other loop in the pair is formed of a nickel alloy wire which is softer than the cobalt nickel alloy.

5. A separable fastening device according to claim 4 wherein the base weave is formed of stainless steel filaments.

6. A separable fastening device according to claim 5 wherein the device is operable at temperatures from cryogenic temperatures of about —400° F. to elevated temperatures of about 1000° F.

7. A separable fastening device according to claim 1 wherein the base member is made of a synthetic plastic which has a melting temperature above 500° F.

8. A separable fastening device according to claim 1 wherein the hooks are formed of a heat hardened spring cobalt nickel alloy wire.

9. A separable fastening device according to claim 8 wherein the base fabric is formed from stainless steel filaments.

References Cited

UNITED STATES PATENTS

| | | | |
|---|---|---|---|
| 2,705,880 | 4/1955 | Kinzinger et al. | 28—72 |
| 2,922,442 | 1/1960 | Webber | 139—425 |
| 3,009,235 | 11/1961 | Mestral | 24—204 |
| 3,234,971 | 1/1966 | Horne et al. | 28—72 |
| 3,320,649 | 5/1967 | Naimer | 28—72 |

HENRY S. JAUDON, Primary Examiner

U.S. Cl. X.R.

28—72, 48